S. HASHIMOTO.
THRUST METER.
APPLICATION FILED MAR. 29, 1918.
1,297,686.
Patented Mar. 18, 1919.
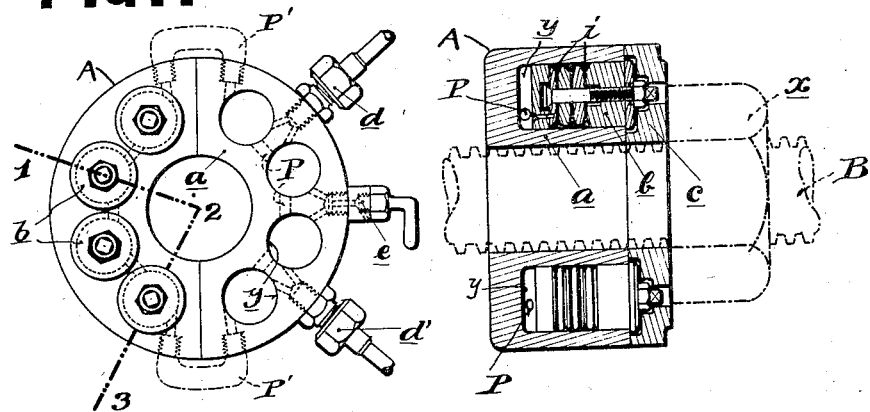

UNITED STATES PATENT OFFICE.

SHUZO HASHIMOTO, OF KOBE, JAPAN, ASSIGNOR TO NIPPON YUSEN KWAISHA LTD., OF TOKYO, JAPAN, A CORPORATION OF JAPAN.

THRUST-METER.

1,297,686.   Specification of Letters Patent.   Patented Mar. 18, 1919.

Application filed March 29, 1918. Serial No. 225,503.

*To all whom it may concern:*

Be it known that I, SHUZO HASHIMOTO, citizen of Japan, residing at No. 79 Hirano Kusunoki-dani-cho, Kobe, Japan, have invented certain new and useful Improvements in Thrust-Meters; and do hereby declare the following to be a full, clear, and exact description of the invention, such as will enable others skilled in the art to which it appertains to make and use the same.

This invention relates to thrust meters and particularly to mechanism for measuring the thrust exerted by a propeller while the ship driven thereby is in motion.

Heretofore models and experimental tanks have been employed to obtain data regarding the efficiency of a propeller operating under conditions approximating those at sea. The results of such experiments are not entirely satisfactory because they only approximate the actual conditions of operation.

The principal object of this invention is therefore to provide a thrust registering or measuring mechanism which will enable the fundamental investigation of ships' resistance, screw propulsion, balancing of parts of engine, etc., directly from the ship itself while the same is in actual service.

Another object of the invention is to provide a thrust meter that may be readily connected to and disconnected from the propeller shaft while the ship and its propelling machinery are in motion.

Another object of the invention is to provide a novel and simple form of fluid pressure thrust-transmitting mechanism in the thrust meter.

The above and other objects and the novel features of the invention will be apparent from the following description taken in connection with the drawing which, as to certain features, is more or less diagrammatic,—

Figure 1 is a plan view of a fluid pressure thrust-transmitting device forming part of the thrust meter embodying my invention, the cover member being removed and half of the pistons also being removed from their cylinders;

Fig. 2 is a longitudinal sectional view taken on the line 1—2—3 of Fig. 1, showing the construction and arrangement of the cylinders and pistons; and Fig. 3 is a view, partially diagrammatic, of the thrust meter embodying my invention applied to the thrust shafts of a twin screw steamer.

Referring to the drawing, the thrust measuring mechanism for each propeller shaft or rotating member whose thrust is to be measured, comprises a thrust block T having supporting members C, C mounted thereon, carrying bearing sleeves $s$ in which a thrust-receiving shaft S is rotatably mounted. The thrust shaft S is adapted to be coupled at one end to the end of the rotating tunnel shaft (not shown) the outer end of which carries a screw propeller. The other end of the thrust shaft S is adapted to be coupled to the engine crank shaft. The engine driving torque is therefore transmitted from the engine through the thrust shaft S to the tunnel shaft and propeller, and the thrust of the latter is in turn exerted against the rotating thrust shaft S through the tunnel shaft. The engine shaft, tunnel shaft and propeller are not shown in the drawing, inasmuch as they are not necessary to a full and complete understanding of the invention.

The thrust shaft transmits its thrust to the thrust indicating means by suitable means, the means herein shown embodying a fluid pressure system having numerous advantages. The supporting members C of the thrust block have two adjusting screws B mounted therein in parallel relation to the thrust shaft S, said screws being operatively connected to the thrust shaft S by any suitable number of thrust shoes $n$, four being used in the present arrangement. The ends of the thrust shoes are rigidly secured to the adjusting screws B by suitable nuts and the intermediate portions of the thrust shoes are disposed between collars $r$ rigidly mounted on the thrust shaft S. Any thrust received by the shaft S will thus be transmitted through the collars $r$ and the thrust shoes $n$ to both of the adjusting screws B, the latter being symmetrically arranged in relation to the thrust shaft.

Each of the adjusting screws B carries a fluid pressure thrust transmitting mechanism by means of which the fluctuations of the thrust are transmitted to the thrust indicating device H which, in the present instance, consists of a fluid pressure gage. In Fig. 3 the fluid pressure thrust transmitting devices are indicated at A, two of the same being mounted on each screw shaft adjacent the supports C, C carried by the thrust block.

Referring to Figs. 1 and 2, each fluid pressure device A consists of a thick ring or annular member a, preferably composed of nickel steel and having a central aperture of sufficient size to slidably fit on the adjusting screw B. The ring a may consist of a single casting, or for facility in assembling, may preferably be composed of two or more segments, such segments being suitably fastened together to form a complete ring. The preferable type of ring is one consisting of two semi-circular segmental parts as shown in Fig. 1. Each segment of the ring contains a plurality of cylindrical cavities or cylinders y, four being provided in each half as shown in the present construction. The several cylinders y of each segment are interconnected by passages P opening into the bottoms of the cylinders, and the pipes P' opposite the joints of the segments provide passages connecting the groups of cylinders in the segments and also serve to assist in securing the segments together. Suitable pistons b are provided for the several cylinders y, the metal parts of said pistons being preferably of nickel steel. The pistons are provided with suitable packing rings i so as to provide a fluid tight fit in the cylinders. The numbers and dimensions of the pistons vary according to the horse power of the engine in use. An annular cover plate c corresponding in diameter to the annular member a has one of its faces recessed to receive the heads of the pistons b. The other face of said plate bears against a nut x secured on the adjusting screw B.

The annular body portions a of the fluid pressure devices A are mounted at such points on the adjusting screws B that the faces thereof abut against the corresponding ends of the supporting members C, and when the meter is not in operation, these fluid pressure devices are held in stationary position and abutting against the said supporting members, by nuts x and J. Fluid may be supplied to the fluid pressure devices A from a suitable source of fluid supply through an inlet pipe d connected to two adjoining cylinders as shown in Fig. 1. Since the cylinders y communicate with each other the pressure in all of the cylinders will be the same. In charging fluid into the cylinders, the air in the cylinders may be discharged therefrom through an air escape valve e. Any suitable means may be provided for supplying the fluid pressure. In the arrangement shown, I have illustrated an oil pump D connected to a distributing box O which has a pressure gage M connected thereto and also has three stop valves E, F and G controlling the flow of the fluid or oil in the thrust measuring mechanism. The valve E permits the flow of oil to the fluid pressure device associated with the thrust shaft S at the right in Fig. 3 and the valve F controls the flow to the thrust transmitting fluid pressure member associated with the thrust shaft at the left in Fig. 3, while the valve G, when opened, relieves the oil pressure in the fluid pressure devices, since it communicates with the suction pipe of the pump D.

The pressure gages H are severally connected to the pipes d' of the fluid pressure devices A and are adapted to indicate fluctuations in the oil pressure in the cylinders y. A hydraulic indicator I communicates through the pipe f with the piping that leads to the fluid pressure devices A and thrust indicating devices H and has an indicating lever that is attached to any suitable reciprocating part of the driving engine in a well known manner.

When the thrust of either of the propeller shafts is to be measured, the fastening nuts J on the screw shafts B are loosened about $\frac{1}{32}$ of an inch. The thrust shoes n are then mounted in position on the thrust shaft S and secured to the adjusting screws B, after which the oil pump D is operated. Oil is admitted to the cylinders y to oppose the thrust exerted by the shaft S and the pistons b and cover c are forced apart from the cylinder member a until the thrust is balanced. The valves F and E are then closed and the oil pressure transmitted to the thrust indicating devices or gages H will increase or decrease in accordance with the thrust received by the shaft S. The fluctuations in the thrust will also be recorded in the proper order on the diagram paper carried by the indicating device I. The indicator I, has a drum which is rotated by connecting the same to a part of the engine by any suitable means, in a well known manner. Micrometers K are arranged adjacent each fluid pressure device A to determine the relative positions of the pistons with respect to their respective cylinders by the measurement of the movement of the pistons and plates c and with a knowledge of the piston area and the mean value of the pressure indicated by the indicating gage H, the total amount of thrust may be calculated.

When the thrust meter is not in operation the oil may be drawn off by opening the valve G thus releasing the pressure in the cylinders y, thereby permitting the pistons b and cover c to return to their initial position. The nuts J may be then turned on the screws B to secure the fluid pressure devices A in abutting relation to the supporting members C. In this position the meters are not affected by the action of the shaft S, and the screws B and the parts carried thereby merely act as distance pieces between the supporting members C on the thrust block. In the arrangement shown, each thrust receiving shaft S has a set of four fluid pressure devices arranged symmetrically with respect thereto, the devices of each set being connected by pipes with each other and to a thrust indicating device H so that the pressures in the fluid pressure devices automatically balance, thus equally dividing the load among the several fluid pressure devices on the thrust block. This is a very desirable feature of the present invention in the specific embodiment shown. It will, of course, be understood that two symmetrically arranged fluid pressure devices A may be used instead of four, if desired.

While I have shown and described the thrust meter in detail it is to be understood that certain features thereof are not necessarily limited to the exact construction of mechanism illustrated, and that various changes may be made in such construction without departing from the spirit of the invention.

What I claim is:

1. A thrust meter comprising the combination with thrust indicating means, of fluid pressure means operatively connected to said indicating means, and means adapted to operatively connect said fluid pressure means to a rotatable member, the thrust of which is to be measured.

2. The combination with a rotatable member, of a meter for indicating the thrust thereof comprising thrust indicating means, relatively movable elements operatively associated therewith, means for exerting a force opposed to the thrust to be measured and tending to restrain the movement of one of said elements, and means adapted to operatively connect said last-mentioned element to the rotatable member, the thrust of which is to be measured.

3. The combination with a rotating member, of a thrust meter associated therewith and comprising thrust indicating means, a fluid pressure cylinder, means comprising a fluid passage connecting said indicating means and cylinder, and a piston fitting in said cylinder and adapted to be restrained in its movement by fluid pressure in said cylinder opposing the thrust to be measured, said piston being adapted to be operatively connected to said rotating member, the thrust of which is to be measured.

4. The combination with a rotating member, of a thrust meter associated therewith comprising thrust indicating means, a source of fluid pressure, a plurality of cylinders connected to said source to receive an initial supply of fluid, and also connected to said indicating means, and pistons fitting in said cylinders and adapted to be restrained in their movement by the pressure of the fluid in the cylinders, said pressure opposing the thrust to be measured, said pistons being adapted to be operatively connected to said rotating member, the thrust of which is to be measured.

5. In a thrust meter, the combination with thrust indicating means, of a rotating device, a thrust block comprising a member adapted to be operatively connected to said rotating device to receive the thrust to be measured, an annular fluid pressure means carried by and operatively connected to said member and also operatively connected to said indicating means, said fluid pressure means comprising one or more sets of cylinders and pistons.

6. In a thrust meter, the combination with thrust indicating means, of a thrust block comprising an adjusting screw, means adapted to connect said adjusting screw to a member that exerts a thrust, fluid pressure means mounted on said adjusting screw comprising an annular member having a plurality of cylinders therein communicating with said thrust indicating means and adapted to communicate with a source of fluid, a plurality of pistons working in said cylinders, a cover member adapted to engage said piston and adapted to receive thrust from said adjusting screw, and an abutment member engageable by said member containing the plurality of cylinders.

7. In a thrust meter, the combination with thrust indicating means, of a thrust block comprising supporting members or abutments, and an adjusting screw mounted in said supporting members, and fluid pressure means carried by said adjusting screw, said fluid pressure means comprising an annular member consisting of two or more connected segmental parts having cylinders therein communicating with said indicating means and adapted to communicate with a source of fluid, pistons working in said cylinders, and a plate member engaging said pistons and engageable by said screw whereby the thrust is transmitted to said pistons.

8. In a thrust meter, the combination with thrust indicating means, of a thrust block comprising a member adapted to receive the thrust to be measured, a plurality of adjusting screws mounted on said thrust block in symmetrical relation to such thrust receiving member, fluid pressure means carried by said adjusting screws and comprising coöperative cylinders and pistons, said cylinders being operatively connected to said indicating means and adapted to communicate with a source of fluid, means for connecting said adjusting screws to the thrust receiving member, and means for transmitting the thrust from said screws to said pistons working in said cylinders.

9. The combination with a thrust shaft, of a thrust meter associated therewith and comprising thrust indicating means, fluid pressure means comprising an annular member consisting of two or more segments having therein one or more cylinders operatively connected to said indicating means and adapted to be connected to a source of fluid, one or more pistons working in said cylinders, and means for transmitting the thrust from said thrust shaft to said pistons.

10. The combination with a plurality of rotatable thrust shafts, of a thrust mechanism associated therewith and comprising thrust indicating means, fluid pressure means operatively connected to said indicating means, and means for transmitting thrust from said thrust shafts to said fluid pressure means.

11. A thrust meter comprising the combination with thrust indicating means, of a thrust block comprising a member adapted to receive the thrust to be measured, supporting members for such thrust receiving member, an adjusting screw mounted on said supporting members, fluid pressure means comprising annular members carried by said adjusting screw and having cylinders therein communicating with said indicating means, pistons working in said cylinders, means for connecting said adjusting screw to the thrust receiving member, and means for transmitting thrust from said screw to the pistons in said cylinders.

In testimony whereof I hereunto affix my signature.

SHUZO HASHIMOTO.